United States Patent
Lin et al.

(10) Patent No.: US 8,320,097 B2
(45) Date of Patent: Nov. 27, 2012

(54) ELECTROSTATIC DISCHARGE STRUCTURE FOR TOUCH PANEL MODULE

(75) Inventors: Chien-Chih Lin, Hsinchu County (TW); Yung-Chan Chou, Hsinchu County (TW); Yu-Iuan Lin, Hsinchu County (TW)

(73) Assignee: Cando Corporation, Hu-Kou, Hsinchu County (TW)

( * ) Notice: Subject to any disclaimer, the term of this patent is extended or adjusted under 35 U.S.C. 154(b) by 442 days.

(21) Appl. No.: 12/774,253

(22) Filed: May 5, 2010

(65) Prior Publication Data

US 2011/0194226 A1 Aug. 11, 2011

(30) Foreign Application Priority Data

Feb. 10, 2010 (TW) ................................ 99104083 A

(51) Int. Cl.
*H01H 47/00* (2006.01)
(52) U.S. Cl. ...................................................... 361/220
(58) Field of Classification Search .................... 361/220
See application file for complete search history.

(56) References Cited

U.S. PATENT DOCUMENTS 7,054,129 B2* 5/2006 Aida et al. ..................... 361/220
8,184,105 B2* 5/2012 Lin et al. ....................... 345/173

FOREIGN PATENT DOCUMENTS

TW 200901013 1/2009

* cited by examiner

*Primary Examiner* — Stephen W Jackson
(74) *Attorney, Agent, or Firm* — Muncy, Geissler, Olds & Lowe, PLLC

(57) ABSTRACT

The present invention discloses an electrostatic discharge structure for a touch panel module to prevent ESD current flowing from the touch panel to the circuit board and damaging the electronic elements. The touch panel module comprises a touch panel and a circuit board. The circuit board has a connection portion connecting the circuit board with the touch panel. The connection portion has a plurality of sensing wires, two ends of each sensing wire are respectively electrically connected with one sensing unit of the touch panel and one sensor chip of the circuit board. The connection portion comprises at least one grounding solder pad and an electric-conduction structure covering thereon. The electric-conduction structure electrically connects the grounding solder pads to direct away the static.

8 Claims, 6 Drawing Sheets

ELECTROSTATIC DISCHARGE STRUCTURE FOR TOUCH PANEL MODULE

FIELD OF THE INVENTION

The present invention relates to an electrostatic discharge (ESD) structure for a touch panel module, particularly to an ESD structure which can direct away from static lest static affect electronic elements in the touch panel module.

BACKGROUND OF THE INVENTION

Herein, the Applicant claims the priority of the filing date of a R.O.C. Application No. 099104083 filed on Feb. 10, 2010, and entitled "Electrostatic Discharge Structure for Touch Panel Module".

At present, the touch control technology has been widely applied to various electronic devices or display equipment, and users can control the electronic device via merely moving his finger or a stylus to contact or approach the touch panel. Thereby, users can input data, read information, and interact with an electronic device in the most direct way. Thus, the touch panel not only exempts users from the inconveniences of inputting data with press buttons, a keyboard, or a joystick but also increases the pleasure of using an electronic device or display equipment.

According to different sensing principles, the touch panels can be categorized into the resistive type, the capacitive type, the infrared type, and the ultrasonic type. Refer to FIG. 1A. The conventional touch panel 1 normally comprises a cover lens 11 and a touch control layer 12. The touch panel 1 can be glued and attached to a display 2 to function as a touch control device. The upper surface of the cover lens 11 is an area where the finger/stylus contacts/points to. The periphery of the lower surface of the cover lens 11 has a pattern layer 13 and the lower surface of the cover lens 11 is stuck to the touch control layer 12 with optical glue 14. The touch control layer 12 has a transparent substrate 15 and a sensing layer 16 formed on the surface of the transparent substrate 15. Refer to FIG. 1B. In the example of the capacitive touch panel, the sensing layer 16 includes a plurality of arrayed sensing units (not shown in the drawing) respectively corresponding to the electric variations in the x-axis or y-axis directions. When the human body contacts the touch panel 1, the capacitance variations and inducted currents can be generated to calculate the coordinates and tracks of the contacted positions.

FIG. 1B is a diagram schematically showing the appearance of a touch panel module 3. The touch panel module 3 comprises a touch panel 1 and a circuit board 4 connected with the touch panel 1. The circuit board 4 includes a plurality of sensor chips 41, for example, the sensor chips 41 respectively corresponding to the x-axis and y-axis. In the touch panel 1, each sensing unit of the sensing layer 16 is electrically connected to the corresponding sensor chip 41 via a metallic wire 5, whereby the sensor chip 41 can receive and process the electric signals from the sensing unit and correctly judge the coordinates of the contacted point.

The touch panel 1 is likely to lead into static generated by contact and friction or conducted from the human body. When the touch panel 1 accumulates too many electric charges, electrostatic discharge (ESD) will occur and damage the electronic elements of the circuit board 4. However, the metallic wires 5 which electrically connect with the sensing layer 16 are not grounded lest the operation of the sensing layer 16 be affected. Besides, numerous metallic wires 5 are densely disposed on a connection portion 42 of the circuit board 4. Thus, intense ESD current is likely to go through the metallic wires 5 and flow into the sensor chip 41 to damage or burn out the sensor chip 41.

A R.O.C. publication No. 200901013 discloses an "ESD Touch Panel and Electronic Devices Equipped with the Same", wherein an ESD protection circuit is installed on a touch panel, and wherein the ESD protection circuit forms a protective frame to direct away ESD current. However, the prior art mentioned above needs an additional circuit formed on the touch panel, which complicates the fabrication process, increases the fabrication time and cost and occupies the edge space of the touch panel. Therefore, the prior art has still room to be improved.

SUMMARY OF THE INVENTION

One objective of the present invention is to provide an electrostatic discharge (ESD) structure for a touch panel module which can prevent ESD current flows from the touch panel to the circuit board and damages the electronic elements of the circuit board.

In the present invention, the touch panel module comprises a touch panel and a circuit board which electrically connected to the touch panel via a connection portion. The connection portion has a plurality of sensing wires. Two ends of each sensing wire are respectively electrically connected with a sensing unit of the touch panel and a sensor chip of the circuit board. To achieve the abovementioned objective, the present invention installs at least one grounding solder pad on the connection portion and covers the connection portion with an electric-conduction structure, wherein the electric-conduction structure is electrically connected with the grounding solder pad, whereby the sensor chip is protected from being damaged by static.

In one embodiment of the present invention, a grounding portion is arranged on the circuit board close to one side of the touch panel to direct away the ESD current that passing through the gap between the touch panel and the circuit board lest the ESD current damages the electronic elements on the circuit board.

The present invention can prevent that the electronic elements of the circuit board is damaged by the ESD current from the touch panel. The present invention is easy to be realized and applies to various types of touch panels. Below, the embodiments are described in detail in cooperation with the drawings to demonstrate the technical contents of the present invention.

BRIEF DESCRIPTION OF THE DRAWINGS

The embodiments of the present invention are described in cooperation with the following drawings.

DETAILED DESCRIPTION OF THE PREFERRED EMBODIMENTS

The technical contents of the present invention are described in detail in cooperation with the drawings below. In addition to the capacitive touch panel, the present invention also applies to the resistive touch panel, inductive touch panel, ultrasonic touch panel and infrared touch panel. Therefore, the applications to the abovementioned touch panels are included within the scope of the present invention. It should be noted that the drawings are not necessarily made according to the physical proportion but only to provide schematic exemplifications. It should be noted also that the elements of the prior arts are omitted in some drawings to make the drawings simple and easy to understand if the omission does not affect the understanding and realization of the present invention.

Figure 1A:
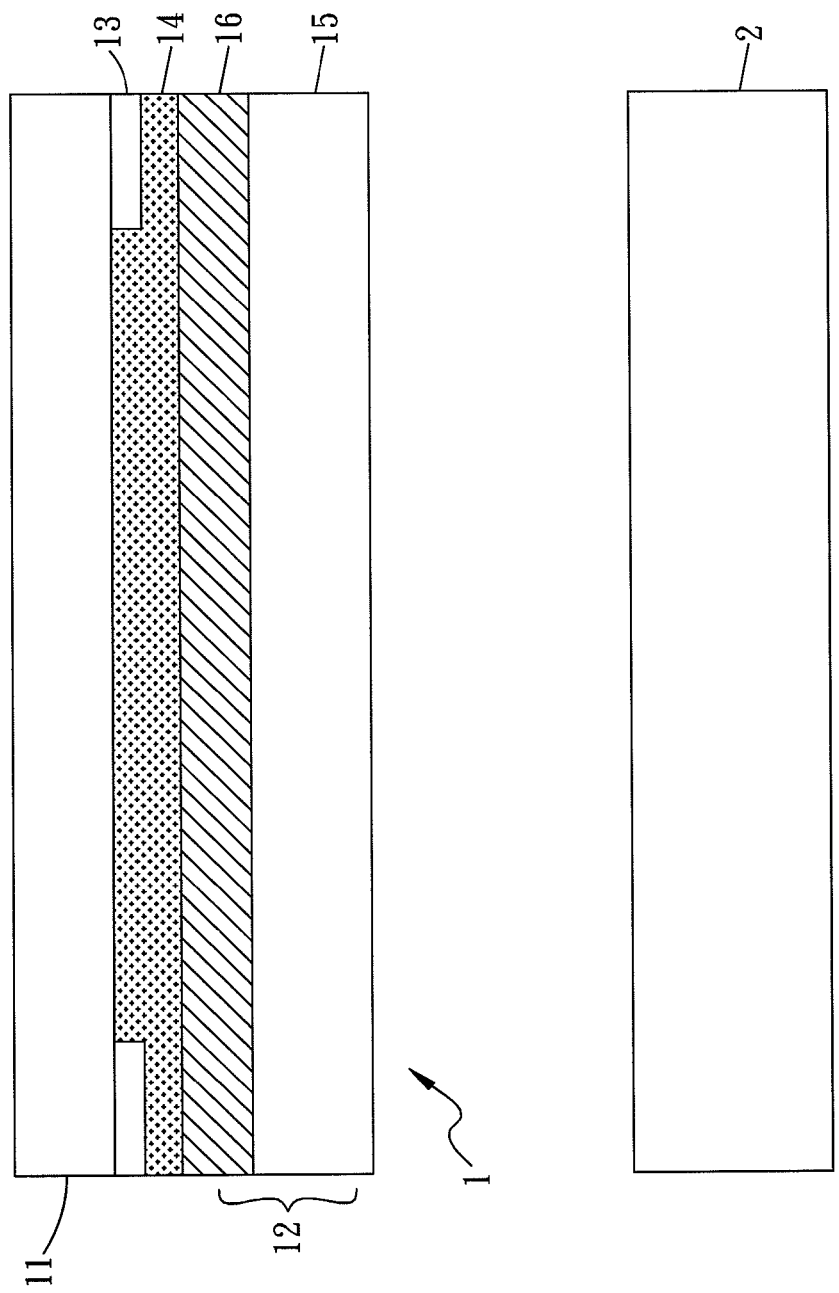
FIG. 1A is a diagram schematically showing the structure of a conventional touch panel.
Figure 1B:
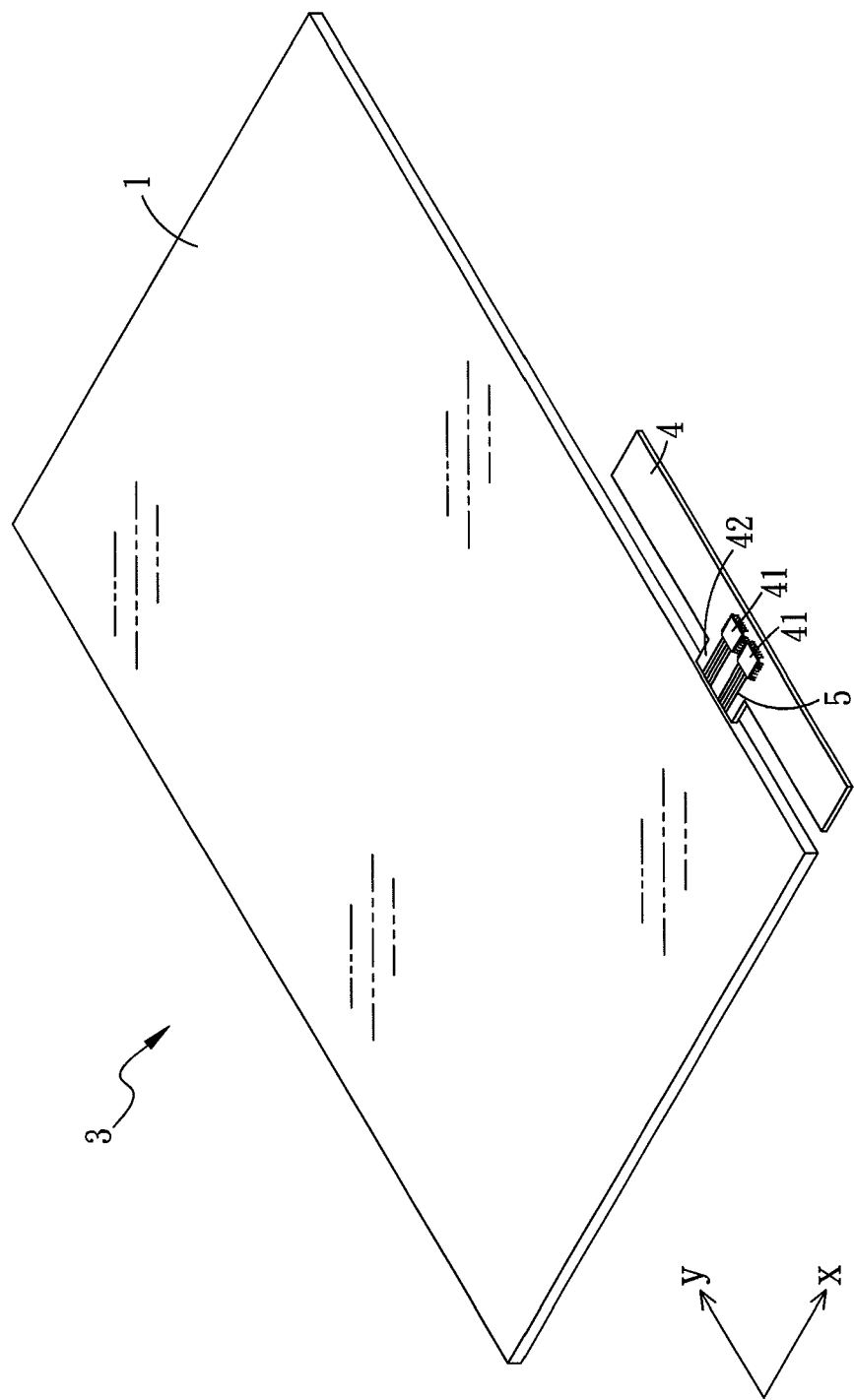
FIG. 1B is a perspective view schematically showing the appearance of a conventional touch panel module.
Figure 2A:
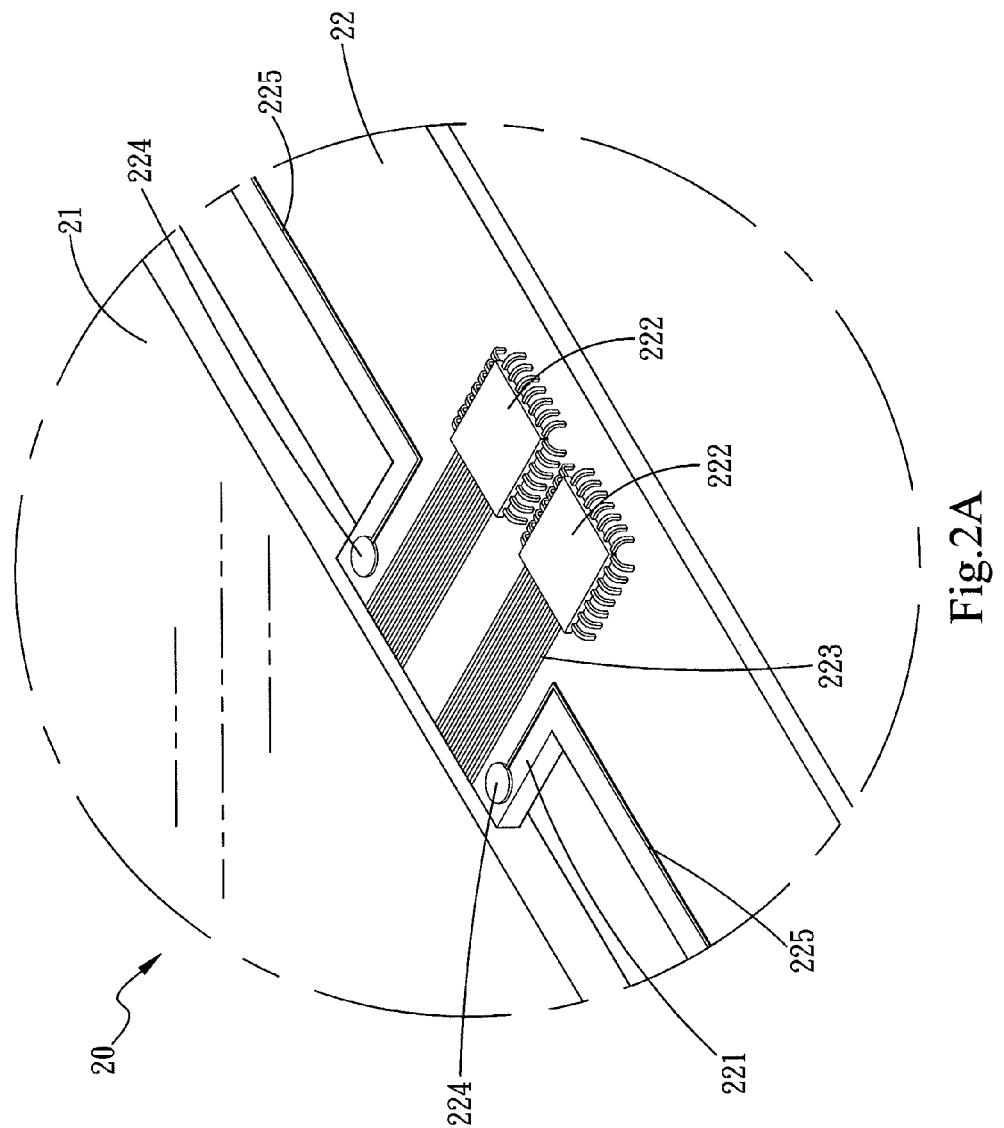
FIG. 2A is a partially enlarged view of a touch panel module according to one embodiment of the present invention.

Refer to FIG. 2A, a partially enlarged view of a touch panel module according to one embodiment of the present invention. The touch panel module 20 comprises a touch panel 21 and a circuit board 22. The circuit board 22 includes a connection portion 221 and a plurality of sensor chips 222. The circuit board 22 and the connection portion 221 are fastened to the touch panel 21. The connection portion 221 has a plurality of sensing wires 223. Two ends of each sensing wire 223 are respectively electrically connected with one corresponding sensor chip 222 and one sensing unit (not shown in the drawings) in the sensing layer of the touch panel 21. The sensing wires 223 of the connection portion 221 are mutually insulated to each other and also insulated to the external environment.

Figure 2B:
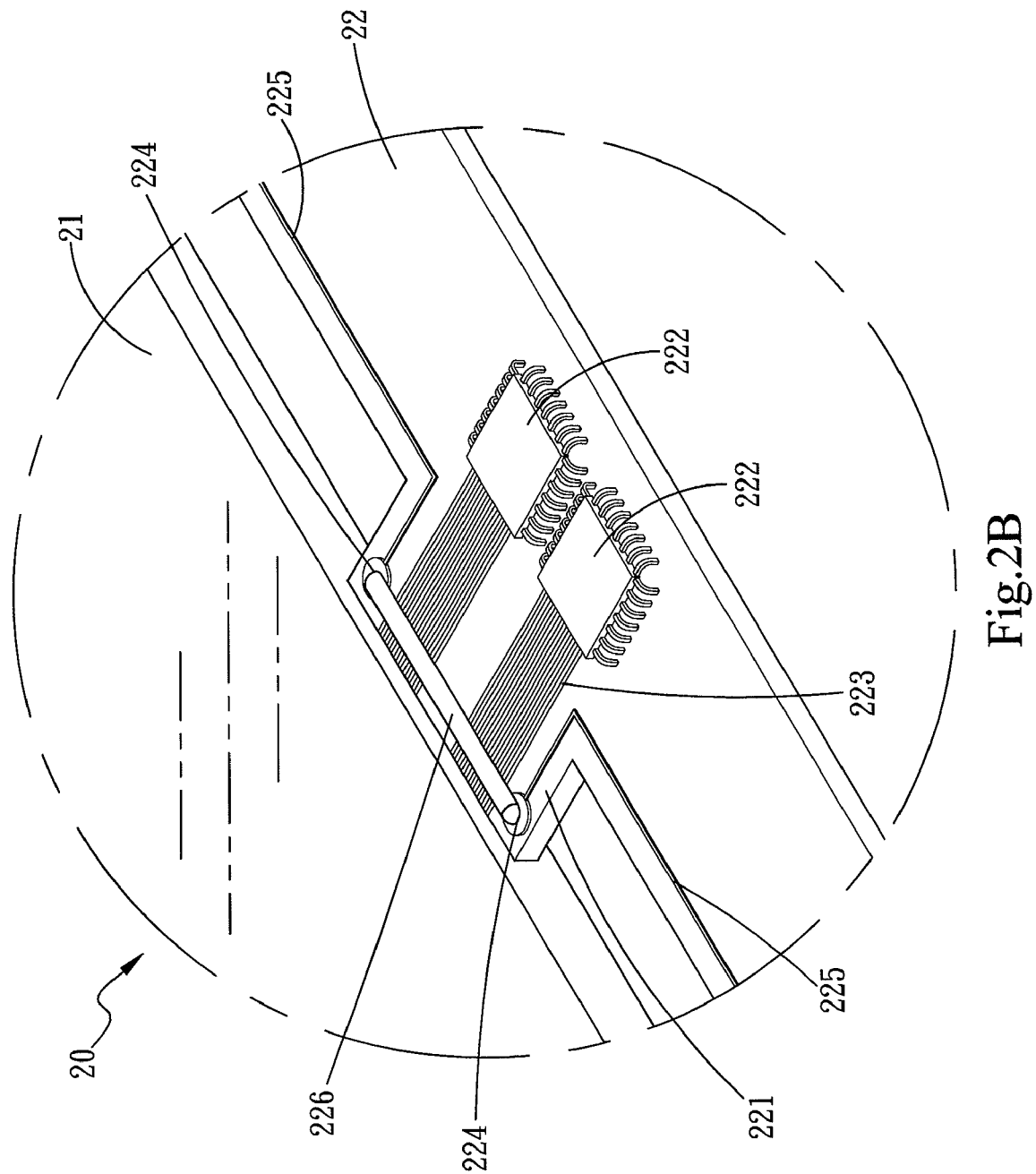
FIG. 2B is another partially enlarged view of a touch panel module according to one embodiment of the present invention.

In one embodiment, at least one grounding solder pad 224 is formed on one side of the connection portion 221 near the touch panel 21 to prevent that ESD current is conducted from the connection portion 221 to the sensor chips 222 and other electronic elements (not shown in the drawings) on the circuit board 22. In FIG. 2A, two grounding solder pads 224 are respectively arranged on two sides of the connection portion 221. Each grounding solder pad 224 is connected to the grounding loop of the circuit board 22 or a low-voltage level (such as the ground) via a grounding wire 225. The grounding wire 225 may be arranged on the surface of the circuit board 22 or on a layer, such as a grounding layer, inside the circuit board 22. Refer to FIG. 2B. An electric-conduction structure 226 covers and electrically connects the connection portion 221 and the grounding solder pads 224 such that the grounding solder pads 224 are conducted with each other. The electric-conduction structure 226 is electrically insulated from the sensing wires 223. Therefore, the electric-conduction structure 226 would not interfere with the sensing process of the touch panel 21. Thus, the electric-conduction structure 226 conducts ESD current from the surface of the touch panel 21 to the grounding solder pads 224. Then, the grounding wires 225 direct the ESD current away from the sensing wires 223 lest the ESD current flows to the sensing wires 223 and damages the sensing loop of the touch panel 21.

In one embodiment, the circuit board 22 is a flexible printed circuit board.

In one embodiment, the electric-conduction structure 226 may be a conductive adhesive or a conductive tape. For example, silver paste is applied to electrically connect the grounding solder pads 224 or a conductive tape is directly stuck to the connection portion 221 and electrically connects the grounding solder pads 224. However, the present invention does not limit the electric-conduction structure 226 to be a conductive adhesive or a conductive tape. To achieve better ESD effect, the electric-conduction structure 226 straddles the entire connection portion 221 and covers all the sensing wires 223 to occupy a larger area of the connection portion 221.

In the present invention, the term "grounding solder pad" includes a grounding metallic solder pad or a metallic contact point. In the present invention, the grounding solder pads 224 and the electric-conduction structure 226 are arranged to near the touch panel 21 as much as possible, so that the static from the touch panel 21 can be fast drained away from the grounding solder pads 224 and the electric-conduction structure 226. In one embodiment, the electric-conduction structure 226 contacts the edge of the touch panel 21. However, the electric-conduction structure 226 should not shelter the touch panel 21 in such a case.

Figure 3A:
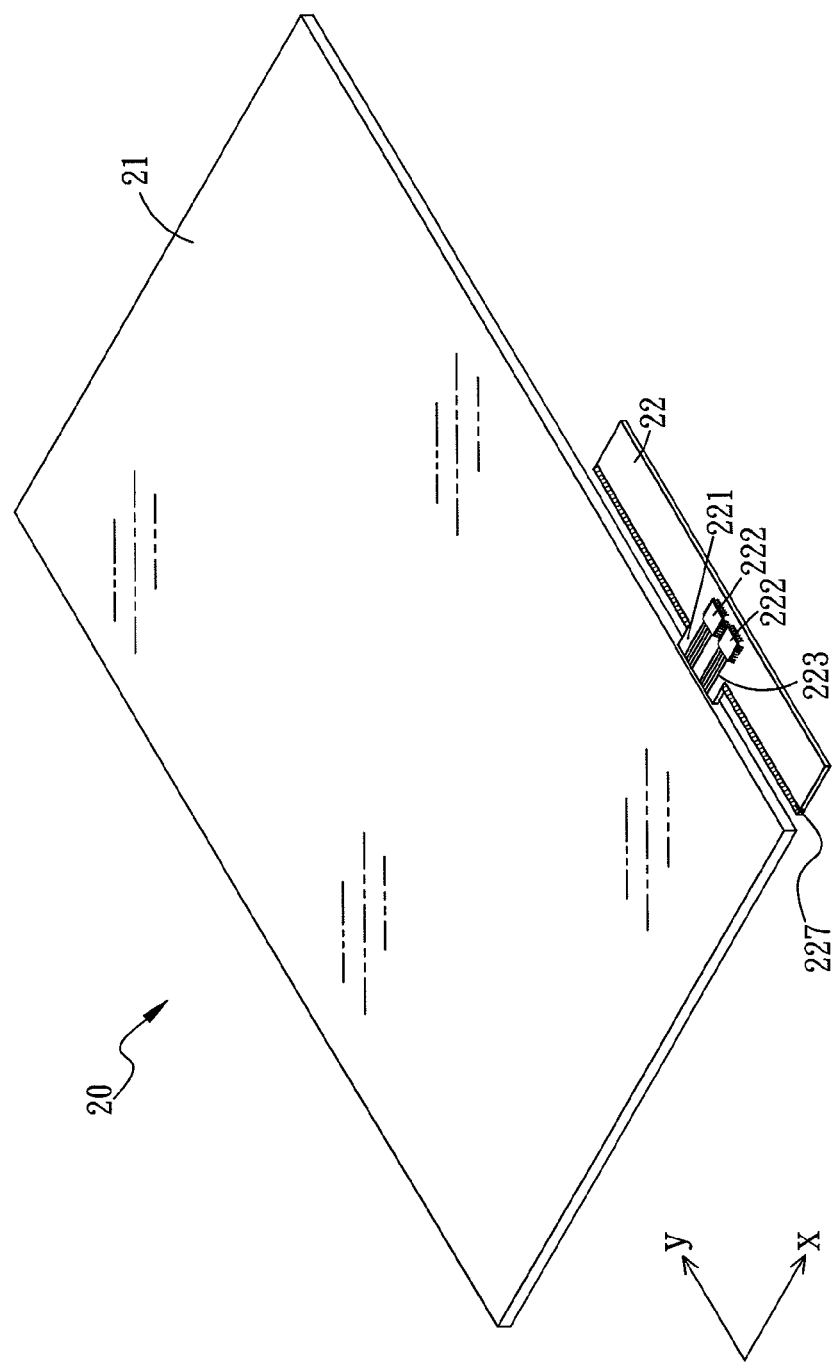
FIG. 3A is a perspective view schematically showing the appearance of a touch panel module according to another embodiment of the present invention.
Figure 3B:
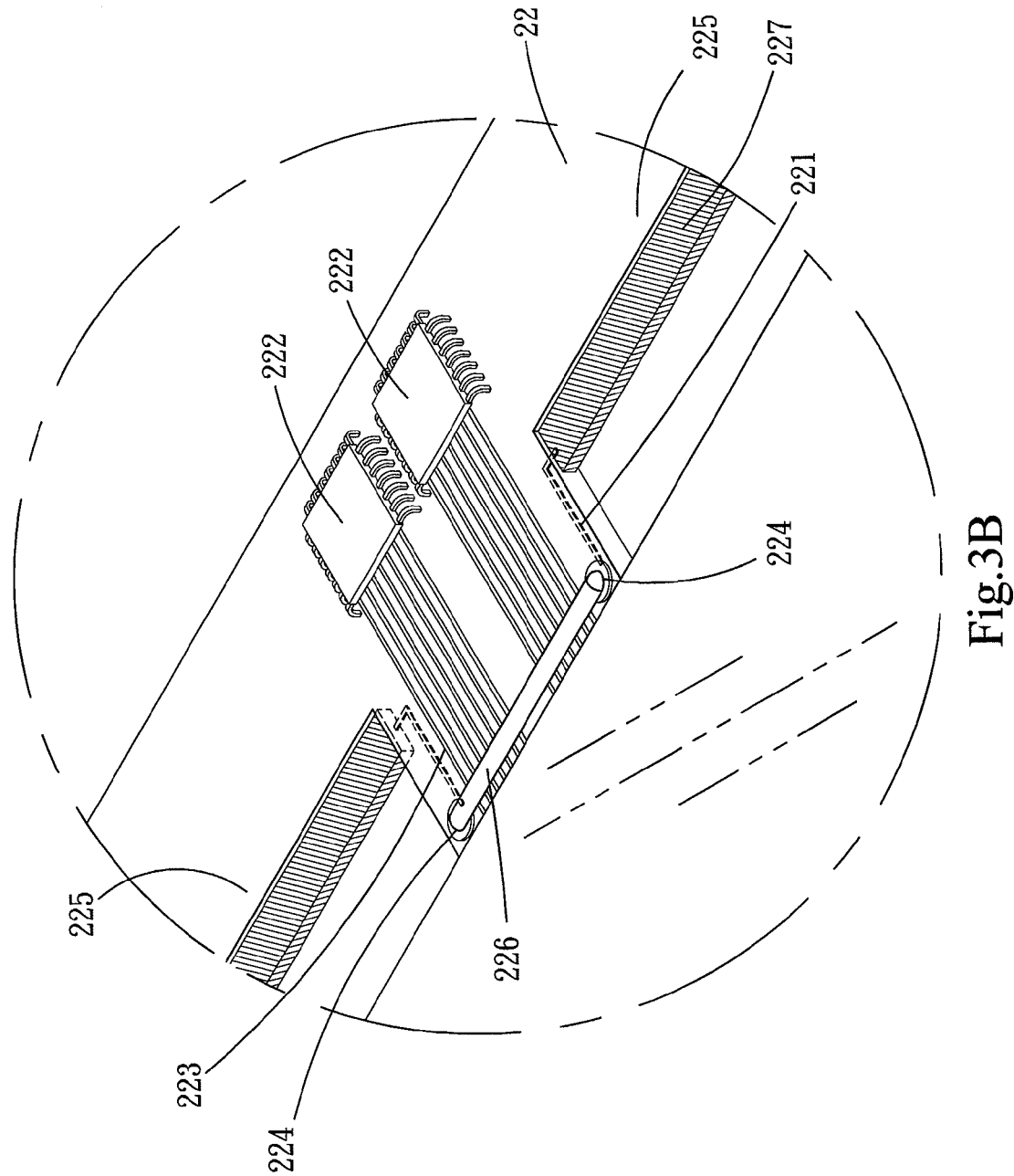
FIG. 3B is a partially enlarged view of a touch panel module according to another embodiment of the present invention.

The ESD current can be conducted from the touch panel 21 to the circuit board 22 via the connection portion 221. When the circuit board 22 is too close to the touch panel 21, the ESD current may also directly stride across the gap between the touch panel 21 and the circuit board 22 and damage the electronic elements on the circuit board 22. Refer to FIG. 3A and FIG. 3B for another embodiment of the present invention. In this embodiment, a grounding portion 227 is arranged on the circuit board 22 close to one side of the touch panel 21 to prevent the ESD current directly conducting to the circuit board 22 from air of the touch panel 21. The grounding portion 227 is electrically connected with the grounding loop of the circuit board 22 or a low-voltage level (such as the ground). Thereby, the ESD current can be directly drained away from the grounding portion 227 without interfering with the electronic elements on the circuit board 22.

In the abovementioned embodiment, the grounding portion 227 may be a peripheral circuit or an exposed grounding layer of the circuit board 22. The circuit board 22 may be a flexible circuit board with a multi-layer structure, which includes a flexible base layer, a cover layer, a grounding layer, etc. In such a case, the Applicant can control the fabrication conditions to expose the grounding layer in the layer of the circuit board 22 close to one side of the touch panel 21. Thereby, the exposed grounding layer can form the grounding portion 227 to protect the circuit board 22 from being affected by the ESD current. Besides, the abovementioned grounding wire 225 connected with the grounding solder pad 224 may be electrically connected with the grounding portion 227 and grounded.

The present invention can prevent ESD current from damaging the sensor chips 222/other electronic elements and disabling the touch panel module via merely installing the grounding solder pads 224 and the electric-conduction structure 226 on the circuit board 22 or installing a grounding portion 227 on the circuit board 22 close to one side of the touch panel 21 to prevent the ESD current damaging other electronic elements on the circuit board 22. Therefore, the present invention is easy to fabricate and has a lower cost.

The embodiments described above are only to exemplify the present invention but not to limit the scope of the present invention. Any equivalent modification or variation according to the technical contents disclosed in the specification and drawings is to be also included within the scope of the present invention.

What is claimed is:

1. An electrostatic discharge structure for a touch panel module, the touch panel module comprises a touch panel and a circuit board, the circuit board includes a connection portion connecting the circuit board with the touch panel, and the connection portion includes a plurality of sensing wires, two ends of each sensing wire are respectively electrically connected with one sensing unit of the touch panel and one sensor chip of the circuit board; and wherein the connection portion further comprises at least one grounding solder pad and an electric-conduction structure, the electric-conduction structure covers the connection portion and electrically connects with the grounding solder pads, whereby is directed away static from the touch panel.

2. The electrostatic discharge structure for a touch panel module according to claim 1, wherein the electric-conduction structure is a conductive adhesive.

3. The electrostatic discharge structure for a touch panel module according to claim 1, wherein the electric-conduction structure is a conductive tape.

4. The electrostatic discharge structure for a touch panel module according to claim 1, wherein the circuit board is a flexible printed circuit board.

5. The electrostatic discharge structure for a touch panel module according to claim 1, wherein the connection portion includes two grounding solder pads respectively arranged on two sides of the sensing wires, and the electric-conduction structure straddles the sensing wires and electrically connects the two grounding solder pads.

6. The electrostatic discharge structure for a touch panel module according to claim 1, wherein the electric-conduction structure is arranged at the boundary of the touch panel and the circuit board.

7. The electrostatic discharge structure for a touch panel module according to claim 1, wherein the circuit board further comprises a grounding portion arranged on the circuit board close to one side of the touch panel.

8. The electrostatic discharge structure for a touch panel module according to claim 7, wherein the circuit board is a flexible circuit board, and the grounding portion is an exposed grounding layer of the circuit board.

* * * * *